United States Patent
Rao et al.

(10) Patent No.: US 12,406,269 B2
(45) Date of Patent: Sep. 2, 2025

(54) UNMEDIATED AND MEDIATED TRANSFER OF OWNERSHIP OF DEVICES

(71) Applicant: Cisco Technology, Inc., San Jose, CA (US)

(72) Inventors: Sandesh K. Rao, Fremont, CA (US); Reda Haddad, San Jose, CA (US); Srihari Raghavan, Chennai (IN); Jabir Hamediya Mohammed, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 352 days.

(21) Appl. No.: 17/830,848

(22) Filed: Jun. 2, 2022

(65) Prior Publication Data

US 2023/0394493 A1 Dec. 7, 2023

(51) Int. Cl.
 *G06Q 30/018* (2023.01)
 *H04L 9/32* (2006.01)
 *H04L 9/40* (2022.01)

(52) U.S. Cl.
 CPC ......... *G06Q 30/018* (2013.01); *H04L 9/3263* (2013.01); *H04L 63/0823* (2013.01); *H04L 63/10* (2013.01)

(58) Field of Classification Search
 CPC ....... G06Q 30/018; H04L 9/32; H04L 9/3263; H04L 9/3265; H04L 63/0823; H04L 63/10
 See application file for complete search history.

(56) References Cited

U.S. PATENT DOCUMENTS

| | | | |
|---|---|---|---|
| 11,681,787 B1 * | 6/2023 | Genner | G06F 21/602 726/7 |
| 2016/0354787 A1 | 12/2016 | Castronovo | |
| 2017/0180132 A1 | 6/2017 | Osborne et al. | |
| 2017/0331896 A1 | 11/2017 | Holloway et al. | |
| 2017/0346848 A1 * | 11/2017 | Smith | H04L 63/1441 |
| 2017/0366347 A1 | 12/2017 | Smith | |
| 2019/0340623 A1 | 11/2019 | Rivkind et al. | |
| 2020/0327231 A1 * | 10/2020 | Smith | G06F 21/33 |
| 2021/0258665 A1 * | 8/2021 | Sadasivarao | H04L 63/0853 |
| 2021/0306157 A1 * | 9/2021 | Wattiau | H04L 9/3265 |
| 2022/0393883 A1 * | 12/2022 | Panchamia | G06Q 20/38215 |
| 2022/0394028 A1 * | 12/2022 | Panchamia | H04L 63/123 |

(Continued)

*Primary Examiner* — Patrice L Winder
(74) *Attorney, Agent, or Firm* — Lee & Hayes, P.C.

(57) ABSTRACT

In one embodiment, methods for mediated transfer of ownership are described. The method may include receiving a request for an ownership voucher from a device, validating an identifier of the device, determining whether to issue the ownership voucher, generating a signed ownership voucher, and sending the signed ownership voucher to the device. In another embodiment, methods for unmediated transfer of ownership are described, including receiving, an ownership voucher associated with a first ownership certificate, determining whether the ownership voucher comprises a signature associated with a manufacturer, based at least in part on determining that the signature of the manufacturer is absent, determining that a second ownership certificate is stored in memory, determining that the second ownership certificate comprises a signature associated with a user, validating the ownership voucher; and based at least in part on the validating, enrolling the first ownership certificate on the network device.

20 Claims, 7 Drawing Sheets

(56) References Cited

U.S. PATENT DOCUMENTS

2023/0299970 A1* 9/2023 Van Huis .............. H04L 9/3263
713/168
2023/0325535 A1* 10/2023 Sharma .................. G06F 21/33
726/17
2024/0086205 A1* 3/2024 Haddad ................ G06F 21/575

* cited by examiner

UNMEDIATED AND MEDIATED TRANSFER OF OWNERSHIP OF DEVICES

TECHNICAL FIELD

The present disclosure relates generally to the field of computing devices, and more particularly to techniques for performing unmediated and mediated transfer of ownership of devices.

BACKGROUND

Security of network devices are crucial for a network. For instance, ensuring security of a network device when ownership is transferred, not only protects data being shared, but also enables a new owner access to security features of the network device (e.g., enhanced security features). One way to provide security to the transfer of network devices is through the use of a proof of ownership. For instance, RFC 8366 describes an example schema for manufacturers to issue a proof of ownership (e.g., such as an ownership voucher—referred to as OV) to the purchaser of the network device. The ownership voucher may include an attribute called a pinned domain certificate (PDC). When the purchaser sends a request for an ownership voucher to the manufacturer, the request may include the PDC that is provided by the purchaser. The purchaser may then receive the ownership voucher and installs the OV on the network device, in a process which enrolls the PDC in the network device. The PDC is used to validate and onboard purchaser signed artifacts (e.g., node configuration file(s), zero touch provisioning (ZTP) script (e.g., such as python) to be executed to provision a node, binaries packages, RPM packages, metadata, etc.). These artifacts play a key role in secure zero touch provisioning of the network device by securely installing and configuring the network device.

While the schema described in RFC 8366 works well where the end customer (the network where the device is deployed) and the purchaser are the same, there are scenarios where end customers and purchasers may not be the same. In these examples, end customers may offload procurement, cabling and racking of the network devices to intermediary users. In this example, when the end customers request an ownership voucher, the manufacturer may not be able validate the ownership of the device to the end customer as the manufacturer's records would indicate the intermediary as the purchaser. Therefore, there exist needs for systems and methods of mediated transfer of ownership of devices where intermediaries and end customers are not the same entity.

Moreover, transferring ownership of network devices to sub-organizations or subsidiaries within the end customer's site may occur frequently and requiring a connection to a manufacturer's service can be time consuming. Therefore, there exist needs for systems and methods of unmediated transfer of ownership of devices where intermediaries and end customers are not the same.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

The present disclosure relates generally to techniques for performing unmediated and mediated transfers of ownership of devices.

A method to perform techniques described herein, where the method may include enrolling a first ownership certificate on the network device; sending, from the network device and to a device associated a user, a request for an ownership voucher, the request being associated with a transfer of ownership of the network device; receiving, from the device, the ownership voucher, the ownership voucher being associated with a second ownership certificate; determining whether the ownership voucher comprises a signature associated with a manufacturer of the network device; based at least in part on determining that the ownership voucher comprises the signature associated with the manufacturer: enrolling the second ownership certificate on the network device; based at least in part on determining that the signature associated with the manufacturer is absent: determining that the first ownership certificate is stored in memory of the network device; determining that the second ownership certificate comprises a signature associated with the user; validating the ownership voucher; and based at least in part on validating the ownership voucher, enrolling the second ownership certificate on the network device.

Another method to perform techniques described herein may include receiving a request for an ownership voucher from a network device, the request including a token and an identifier of the network device, validating the identifier of the network device, determining, based at least in part on the token, to issue the ownership voucher, generating a signed ownership voucher, and sending, to the network device, the signed ownership voucher.

Additionally, the techniques described herein may be performed by a system and/or device having non-transitory computer-readable media storing computer-executable instructions that, when executed by one or more processors, performs the method described above.

EXAMPLE EMBODIMENTS

Security of network devices are crucial for a network. For instance, ensuring security of a network device when ownership is transferred, not only protects data being shared, but also enables a new owner access to security features of the network device (e.g., enhanced security features). One way to provide security to the transfer of network devices is through the use of a proof of ownership. For instance, RFC 8366 describes an example schema for manufacturers to issue a proof of ownership (e.g., such as an ownership voucher—referred to as OV) to the purchaser of the network device. The ownership voucher may include an attribute called a pinned domain certificate (PDC). When the purchaser sends a request for an ownership voucher to the manufacturer, the request may include the PDC is provided by the purchaser. The purchaser may then receive the ownership voucher and installs the OV on the network device, in a process which enrolls the PDC in the network device. The PDC may be used to validate and onboard purchaser signed artifacts (e.g., node configuration file(s), zero touch provisioning (ZTP) script (e.g., such as python) to be executed to provision a node, binaries packages, RPM packages, metadata, etc.). These artifacts play a key role in secure zero touch provisioning of the network device by securely installing and configuring the network device.

While the schema described in RFC 8366 works well where the end customer (the network where the device is deployed) and the purchaser are the same, there are scenarios where end customers and purchasers may not be the same. In these examples, end customers may offload procurement, cabling and racking of the network devices to intermediary users. In this example, when the end customers request an ownership voucher, the manufacturer may not be able validate the ownership of the device to the end customer as manufacturer's records would indicate the intermediary as the purchaser. Therefore, there exist needs for systems and methods of mediated transfer of ownership of devices where intermediaries and end customers are not the same entity.

Moreover, transferring ownership of network devices to sub-organizations or subsidiaries within the end customer's site may occur frequently and requiring a connection to a manufacturer's service can be time consuming. Therefore, there exist needs for systems and methods of unmediated transfer of ownership of devices where intermediaries and end customers are not the same.

This disclosure describes techniques and mechanisms for performing unmediated transfer of ownership of a device. For instance, the techniques may comprise enrolling a first ownership certificate on the network device; sending, from the network device and to a device associated a user, a request for an ownership voucher, the request being associated with a transfer of ownership of the network device; receiving, from the device, the ownership voucher, the ownership voucher being associated with a second ownership certificate; determining whether the ownership voucher comprises a signature associated with a manufacturer of the network device; based at least in part on determining that the ownership voucher comprises the signature associated with the manufacturer: enrolling the second ownership certificate on the network device; based at least in part on determining that the signature associated with the manufacturer is absent: determining that the first ownership certificate is stored in memory of the network device; determining that the second ownership certificate comprises a signature associated with the user; validating the ownership voucher; and based at least in part on validating the ownership voucher, enrolling the second ownership certificate on the network device.

Moreover, this disclosure describes techniques and mechanisms for performing mediated transfer of ownership of devices. For instance, the techniques may comprise receiving a request for an ownership voucher from a network device, the request including a token and an identifier of the network device, validating the identifier of the network device, determining, based at least in part on the token, to issue the ownership voucher, generating a signed ownership voucher, and sending, to the network device, the signed ownership voucher.

In some examples, the request may comprise a private key (e.g., a Secure Unique Device Identification (SUDI)) associated with the network device. In some examples, the techniques may further include signing and/or embedding one or more artifacts with a user's PDC. In some examples, the artifacts may comprise one or more metadata elements from the network device's Trusted Platform Module (TPM). A TPM used in a computing system can report on the hardware and software of the system in a manner that allows verification of expected behavior associated with that system and, from such expected behavior, establishment of trust. The TPM can be a system component containing state that is separate from the host system on which the TPM reports identity and/or other information. TPMs can be implemented on physical resources (indirectly or directly) of the host system. In some examples, a TPM component can have a processor and memory such as RAM, ROM and/or flash memory. In other implementations of a TPM, a host processor can run TPM code while the processor is in a particular execution mode. Parts of system memory can be partitioned by hardware to ensure that memory used by the TPM is not accessible by the host processor unless the host processor is in the particular execution mode. In some examples, each counter and/or the record count can individually, or in combination be encrypted (e.g., signed) using the private key associated with the network device and/or manufacturer.

In some examples, metadata elements (e.g., artifacts) containing security measurements or evidence can be used to provide verifiable evidence of device trustworthiness. The metadata elements can include applicable data for verifying trustworthiness of a network device and be provided through an applicable technique for validating a network device. For example, the metadata elements can be provided as part of the request and/or as artifacts included in the ownership voucher and/or PDC. In some examples, the metadata can include the proof of integrity via a Canary stamp, a hardware fingerprint, a SUDI of the source device, or an attestation key.

In this way, unmediated transfers of ownership may enable network devices to embed the PDC of the end customer in memory, thereby signifying the end customer as the new owner of the network device. Accordingly, unmediated transfer of ownership of the network device may occur in a seamless and secure manner, without having to rely on connecting to the services hosted by the manufacturer and/or controller.

Moreover, in mediated transfers of ownership, the controller may provide a secure and mediated transfer of assets between intermediaries and also between different sub-organizations in an end customer's network. By ensuring that intermediary users cannot claim ownership of a network device until either (i) a token expires or (ii) the end user notifies the controller of a relinquishment of ownership, the controller provides additional control to manufacturer and end customers and prevents theft and unauthorized use of network devices.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1A:
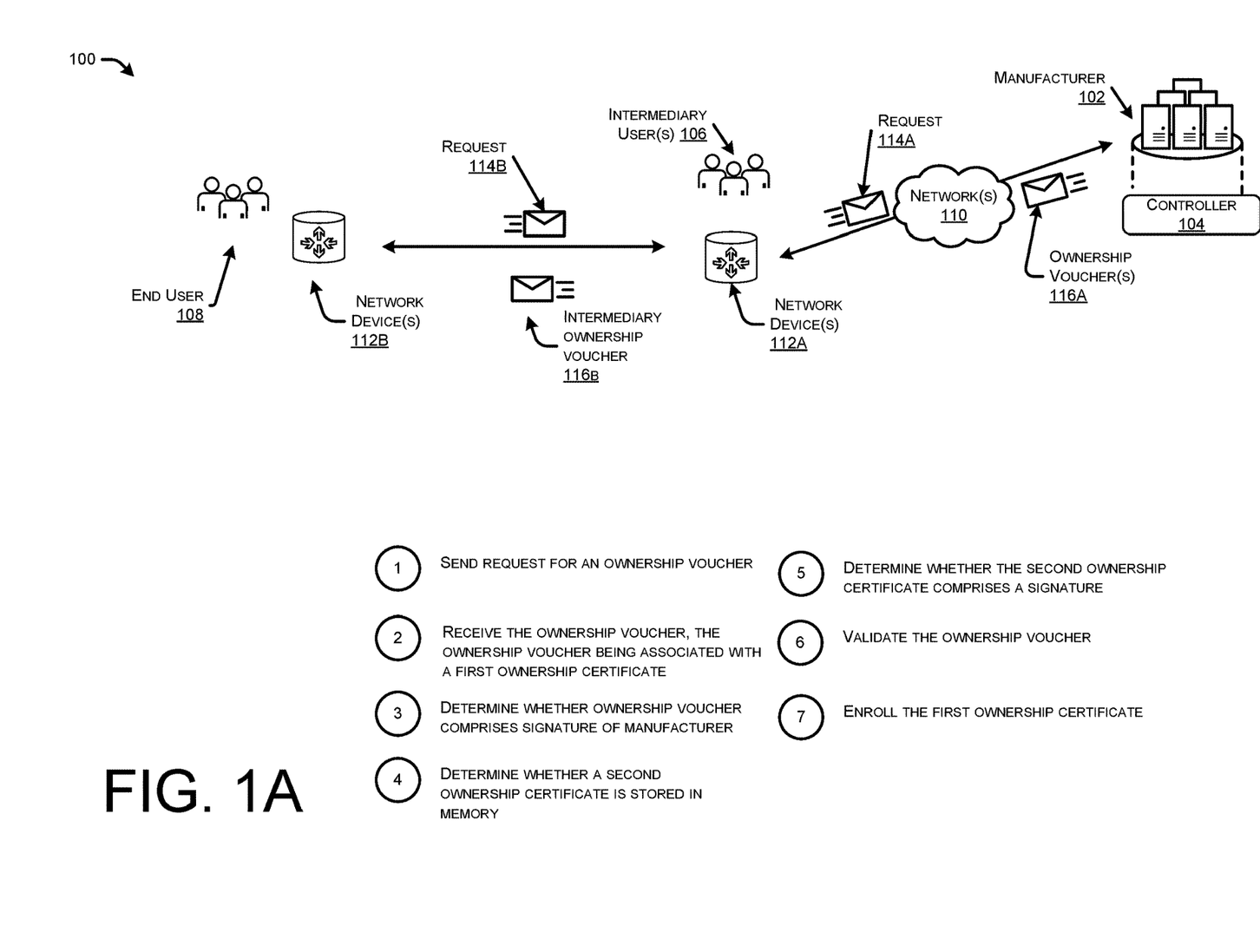
FIG. 1A illustrates a system-architecture diagrams of an environment in which a controller performs unmediated transfer of ownership.

FIG. 1A illustrates a system-architecture diagrams of an environment 100 in which a controller 104 performs unmediated transfer of ownership.

In some examples, the environment 100 may include a manufacturer 102. In some examples, the manufacturer 102 corresponds to a service network that includes devices housed or located in one or more data centers. The service network may include one or more networks implemented by any viable communication technology, such as wired and/or wireless modalities and/or technologies. The service network may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The service network may include devices, virtual resources, or other nodes that relay packets from one network segment to another by nodes in the computer network. The service network may include multiple devices that utilize the network layer (and/or session layer, transport layer, etc.) in the OSI model for packet forwarding, and/or other layers.

The one or more data centers may be physical facilities or buildings located across geographic areas that designated to store networked devices that are part of manufacturer 102. The data centers may include various network devices, as well as redundant or backup components and infrastructure for power supply, data communications connections, environmental controls, and various security devices. In some examples, the data centers may include one or more virtual data centers which are a pool or collection of cloud infrastructure resources specifically designed for enterprise needs, and/or for cloud-based service provider needs. Generally, the data centers (physical and/or virtual) may provide basic resources such as processor (CPU), memory (RAM), storage (disk), and networking (bandwidth). However, in some examples the devices in the packet-forwarding networks may not be located in explicitly defined data centers, but may be located in other locations or buildings.

In some examples, the manufacturer 102 comprises one or more services accessed via the controller 104. For instance, examples of a service may include Cisco MASA server. Additionally, or alternatively, the manufacturer 102 may comprise one or more databases storing information associated with the network device(s).

In some examples, network device(s) 112 correspond to device(s) manufactured by manufacturer 102. For instance, network device(s) 112 may comprise routers, switches, computers, or any other type of network device. For instance, an example network device 112 may correspond to Cisco IOS-XR device(s), or any other suitable type of network device. In some examples, the network device 112 are configured to require ownership vouchers to be signed by a manufacturer's private key. For instance, where the network device 112 is a Cisco IOS-XR device, the network device 112 may be configured to require an ownership voucher to be signed by Cisco's PKI infrastructure. Additionally, or alternatively, the network device 112 may store a public portion of a key associated with the manufacturer in memory. For instance, the public portion of the key may be stored in secure storage (e.g., such an in the TPM) of the network device and/or as part of software that has been securely booted on the device.

In the system illustrated in FIG. 1A, intermediary users 106 may communicate with the manufacturer 102 via the network(s) 110. In some examples, one or more of the operations and/or communications shown in FIG. 1A may be performed using a USB drive or the like. In some examples, intermediary users 106 correspond to an initial purchaser of the network device. For instance, the intermediary user 106 may be partner(s) of the manufacturer 102 that purchase network devices 112 and installs them for end users 108. In some examples, the end user 108 comprises an end customer (e.g., company (such as Google), or other suitable user). In some examples, the controller 102 and/or manufacturer 102 does not know who the end user 108 is when a network device is originally purchased, so enhanced security features of the network device 112 may not be enabled initially.

As described in greater detail below with regard to FIG. 2, when an intermediary user purchases network device 112A, the manufacturer 102 and/or controller 104 may record information (e.g., device information (serial number, SUDI, etc.), purchaser identity (name, etc.), or any other type of information) associated with the purchaser in one or more databases of the manufacturer 102. The intermediary user 106 may then initialize the network device 112 and send, via the network 110, a request to the manufacturer 102 and/or controller 104 for an ownership voucher. As described above, the request may include a pinned domain certificate (I-PDC) associated with the intermediary user 106. In some examples, the I-PDC may comprise a non-CA certificate. The manufacturer 102 and/or controller 104 may validate, based on accessing information from the database(s), the ownership of the network device. Based on validating ownership, the manufacturer 102 and/or controller 104 may sign a payload of an ownership voucher with the manufacturer's private key and send the signed ownership voucher to the intermediary user 106 via the network 110. The network device 112A may then install the signed ownership voucher, where the network device 112 validates the signature of the signed ownership voucher using the public key stored in memory of the network device 112. The network device 112 may also validate the ownership voucher by checking the SUDI. Once validated, the network device 112 installs the signed ownership voucher and stores the ownership voucher in the TPM of the network device.

Networks 110 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network device(s) 112 may communicate using any type of protocol over the network(s) 110, such as the transmission control protocol/Internet protocol (TCP/IP) that is used to govern connects to and over the Internet.

As illustrated in FIG. 1A, an end user may communicate with the intermediary user 106 in order to facilitate an unmediated transfer of ownership of the network device 112. In some examples, the end user 108 corresponds to an end customer (e.g., such as a company, customer, etc.). In some examples, transfer of ownership of the network device 112 occurs between one or more intermediary users 106 prior to a transfer to the end user 108.

For instance, the end user 108 may communicate with the intermediary user 106 via network device 112. In some examples, the network device 112B of the end user may communicate with a network device 112A of the intermediary user 108 and/or any other computing device associated with the intermediary user 106. In some examples, the end user 108 and the intermediary user 106 communicate via a private network (not shown). In some examples, the end user 108 and the intermediary user 106 may perform communications directly, such as in person, via a USB drive, or any other suitable form of communication. For instance, in some examples, an end user 108 and/or intermediary user 106 may install an ownership voucher onto a network device via a USB drive.

At "1", the network device 112B may send a request for an ownership voucher to a device of the intermediary user 106. In some examples, the end user 108 may send the request directly to the intermediary user 106 (e.g., such as when the intermediary user 106 and/or end user 108 is out-of-band (e.g., using a separate network)). For instance, the device of the intermediary user 106 may comprise a network device 112A or any other type of computing device, user device, system, etc. In some examples, the request 114 is sent via a local network and/or a private network (e.g., VPN, etc.), or any other suitable network type. As noted above, the request 114 may include a request for the intermediary user to issue an ownership voucher. Additionally, or alternatively, the request may comprise a PDC associated with the end user. In some examples, the PDC of the end user is used by the intermediary user 106 and/or device of the intermediary user 106 to sign one or more artifacts (e.g., metadata).

At "2", the network device 112B may receive from the device 112A of the intermediary user 106, the ownership voucher. In some examples, the ownership voucher may be associated with a first ownership certificate. For instance, the intermediary user 106 and/or device of the intermediary user 106 may validate the request and sign an intermediary ownership voucher artifact with a private portion of the intermediary PDC. The signed intermediary ownership voucher (I-OV) and/or first ownership certificate may then be sent to the network device 112B. In some examples, the end user 108 may receive the ownership voucher directly from the intermediary user 106, such as via a USB, a private network, or the like. In some examples, the first ownership certificate may correspond a new ownership certificate (e.g., an ownership certificate that is to be onboarded and/or enrolled on the network device 112B).

At "3" the network device 112B may determine whether the ownership voucher comprises a signature of the manufacturer 102. For instance, the network device 112B may determine whether the signature in the I-OV is signed by the private key associated with the manufacturer 102. Where the I-OV is not signed by the private key of the manufacturer, the network device proceeds to "4." Where the I-OV is signed by the private key of the manufacturer, the network device 112 will enroll the ownership voucher pending other validation. For instance, the network device 112 may store the first ownership certificate, PDC, and/or artifacts associated with the ownership voucher in memory of the network device 112.

At "4", the network device 112B may determine whether a second ownership certificate is stored in memory of the network device 112B. For instance, where the I-OV is not signed by the manufacturer's private key, the network device 112B may determine whether a second ownership certificate is already present in the memory of the network device. In some examples, the second ownership certificate is associated with a second ownership voucher. For instance, the second ownership certificate may correspond to an "old" ownership certificate (e.g., a previously onboarded and/or enrolled ownership certificate) and may be chained to an I-PDC associated with a previous ownership voucher and/or previous owner.

At "5", the network device 112B may determine whether the ownership voucher comprises a signature associated with second ownership certificate. For instance, the network device 112B may determine that the ownership voucher is signed by the I-PDC associated with the second ownership certificate. In this way, the network device 112B can verify that the incoming I-OV is signed by the I-PDC already installed on the network device 112B (e.g., which verifies ownership of the network device 112B).

At "6", the network device 112B may validate the ownership voucher. For instance, the network device 112B may validate the I-OV where the I-OV is signed by the I-PDC of the network device 112B. In some examples, the network device 112B may validate one or more additional artifacts (e.g., SUDI, etc.).

At "7", the network device 112B may enroll the first ownership certificate on the network device 112B. For instance, the network device 112B may replace the second ownership certificate (e.g., the existing and/or "old" ownership certificate) with the first ownership certificate of the I-OV (e.g., new ownership certificate). In some examples, the first ownership certificate of the I-OV and/or one or more artifacts of the I-OV (e.g., PDC of the end user, I-PDC, public key of the I-OV, etc.) are embedded in memory of the network device 112B. Additionally, or alternatively, the end user may enroll and/or embed additional signed artifacts, where the additional artifacts are signed with the PDC of the end user. In this way, the network device 112B may embed the PDC of the end user in memory, thereby signifying the end user as the new owner of the network device. Moreover, by replacing the old ownership certificate (e.g., the second ownership certificate) with the new ownership certificate (e.g., the first ownership certificate), the current techniques provide improved security by preventing multiple ownership certificates and/or PDC's from being stored by the network device and used to validate against PDC's of any ownership vouchers. For instance, by replacing the old ownership certificate with the new ownership certificate, the current techniques prevent an intermediary user from installing artifacts on the network device without an end user's consent and/or awareness, which may compromise network security of the end user. Accordingly, unmediated transfer of ownership of the network device 112 may occur in a seamless and secure manner, without having to rely on connecting to the services hosted by the manufacturer and/or controller.

Figure 1B:
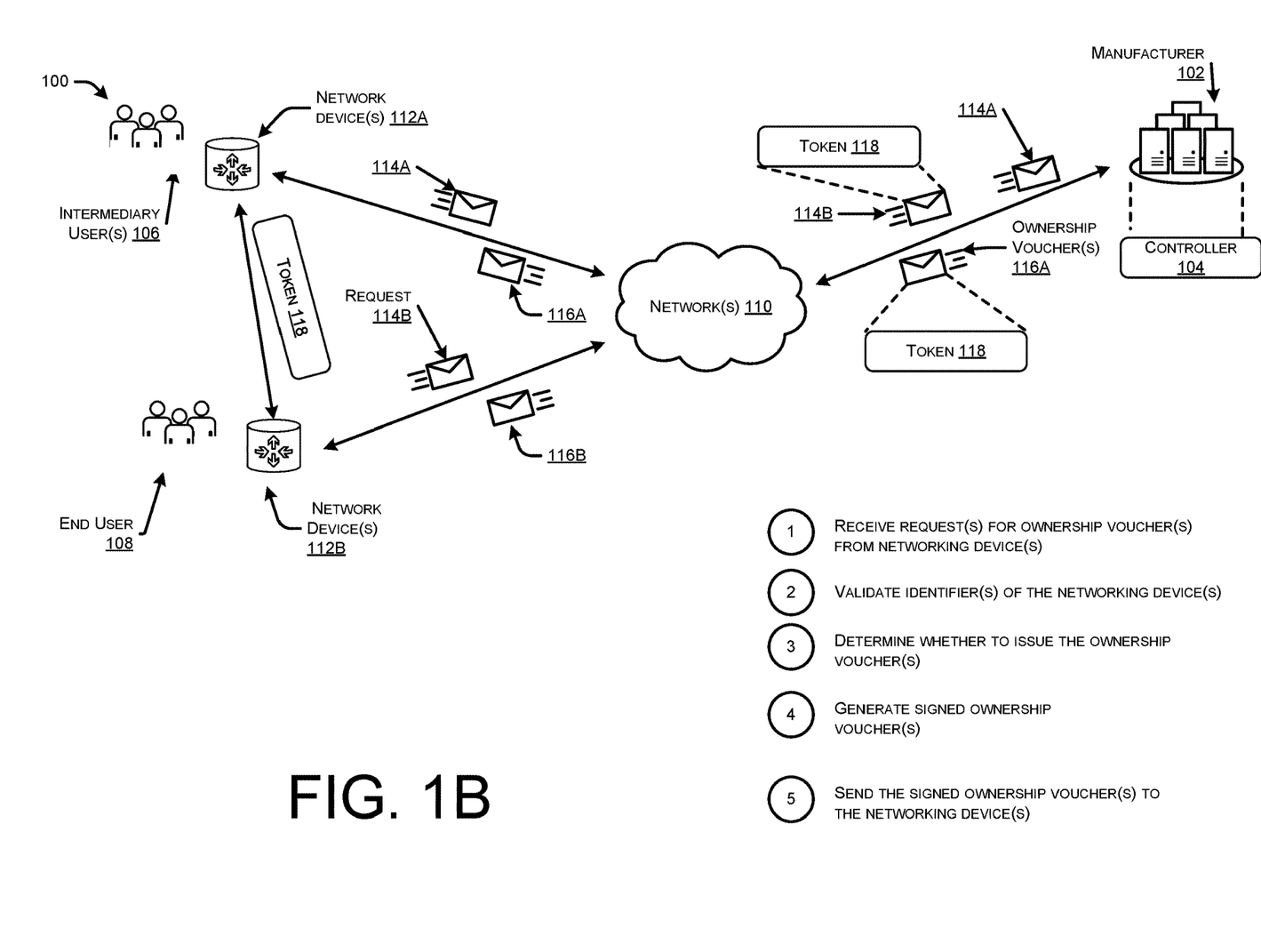
FIG. 1B illustrates a system-architecture diagrams of an environment in which a network device performs mediated transfer of ownership.

FIG. 1B illustrates a system-architecture diagrams of an environment 100 in which a controller 104 performs mediated transfer of ownership. In some examples, the controller 104 performs mediated transfer of ownership between an intermediary user 106 and an end user 108. In other examples, the controller 104 performs mediated transfer of ownership between multiple intermediary users 106. In some examples, one or more of the operations and/or communications shown in FIG. 1B may be performed using a USB drive or the like.

In some examples, the controller 104 may receive a request 114A from an intermediary user 106 after the intermediary user initially purchases the network device 112A. In this example, the controller 104 stores information associated with the initial purchase of the network device 112 in one or more databases associated with the manufacturer. When the intermediary user sends a request for an ownership voucher, the request may comprise one or more identifiers of the network device. Additionally, or alternatively the request 114A may include a request for a transfer token (e.g., token 118) from the manufacturer and/or information associated with a transfer of ownership to an end user (e.g., end user information, duration of the transfer, or any other suitable information). As described in greater detail below, the transfer token 118 may be used by the controller 104 to verify and/or track ownership of the network device 112. The token 118 may be a cryptographically signed token that is signed by the manufacturer 102 and/or controller 104. In some examples, the token 118 comprises a signed and encrypted payload that contains one or more of (i) device identifier(s) (e.g., PID, serial number, SUDI, etc.), (ii) validity of the token (e.g., expiration date, duration of validity, etc.), (iii) new owner information (e.g., name, etc.), (iv) any other manufacturer specific attributes, and/or (v) a signature associated with the controller 104 and/or manufacturer 102 (e.g., private key(s) of the manufacturer 102). In some examples, the encryption may be performed using an encryption protocol (e.g., SSL, TSL, DTSL, etc.). The controller 104 may validate that the intermediary user purchased the network device 112 and verifies that the network device 112 can be transferred. For instance, the controller 104 may identify who is currently registered as the owner of the network device and who the network device is being transferred to. In some examples, the controller 104 may invalidate any ownership vouchers that have been previously issued for the network device. Where the controller 104 determines that the network device 112 is eligible for a transfer, the controller generates a signed ownership voucher. In some examples, the signed ownership voucher comprises the token 118. The controller 104 may store the signed ownership voucher, information associated with the transfer of ownership (e.g., indicating the intermediary user 106 as the new owner, a duration associated with the transfer, etc.), and/or information associated with the token 118. In this way, the controller 104 and/or manufacturer 102 can utilize the token 118 to track transfers of ownership and override previous ownership vouchers associated with the network device 112.

At "1", the controller 104 may receive request(s) 114 for ownership vouchers from network device(s) 112. In some examples, the controller 104 receives a request 114 for an ownership voucher from the end user 108. In this example, the request 114 may comprise a token 118, device identifiers (e.g., serial number, SUDI, etc.), a customer PDC, and/or any other information associated with the end user 108. In this example, the token 118 is received by the network device 112B of the end user 108 from a network device 112A and/or a device of the intermediary user 106. For instance, the end user 108 may receive the token 118 from the intermediary user 106 via a secure communication channel and/or any secure protocol, encryption protocol (e.g., SSL, TSL, DTSL, etc.), TLS connection, etc.

At "2", the controller 104 may validate identifiers of the network device(s) 112. For instance, the controller 104 may access information associated with the network device 112 from one or more databases. The controller 104 may determine, based on the information and/or the identifiers of the network device 112 in the request, whether the network device 112 may be transferred to the end user. For instance, the controller 104 may determine that ownership of the network device 112 can be transferred to the end user based on checking a name of the end user with a name stored in the one or more databases (e.g., included in the information previously received from the intermediary user 106). Additionally, or alternatively, the controller 104 may validate the customer PDC.

At "3", the controller 104 may determine whether to issue the ownership voucher(s). For instance, the controller 104 may issue the ownership voucher to the end user if the controller 104 determines the following requirements are met: token data stored in the one or more databases matches the token 118 included in the request 114 from the end user 108, the token 118 has not expired, and/or where the token 118 includes ownership information, determining that the ownership information in the request 114 matches the ownership information associated with the new owner in the one or more databases and/or token 118.

At "4", the controller 104 may generate signed ownership voucher(s). For instance, the signed ownership voucher may be signed using a private key of the controller 104 and/or manufacturer 102.

At "5", the controller 104 may send the signed ownership voucher(s) to the network device(s). For instance, the signed ownership voucher may be sent directly from the controller 104 to the network device 112 of the end user 108. The network device 112 of the end user 108 may then verify that the signed ownership voucher comprises the private key of the manufacturer 102 and/or controller 102 and, if so, proceed with enrolling the signed ownership voucher and/or other signed artifacts comprising the customer's PDC. For instance, the network device 112 of the end user may install the signed ownership voucher (which comprises the customer's PDC using command line protocols (e.g., such as SZTP, IOS-XR, etc.), thereby enabling the end user 108 to claim ownership of the network device 112 and enable one or more enhanced security features.

In this way, the controller 104 may provide a secure and mediated transfer of assets between intermediaries and also between different sub-organizations in a customer's network. By ensuring that intermediary users cannot claim ownership of a network device until either (i) the token 118 expires or (ii) the end user notifies the controller 104 of a relinquishment of ownership, the controller 104 provides additional control to manufacturer and end users and prevents theft and unauthorized use of network devices.

Figure 2:
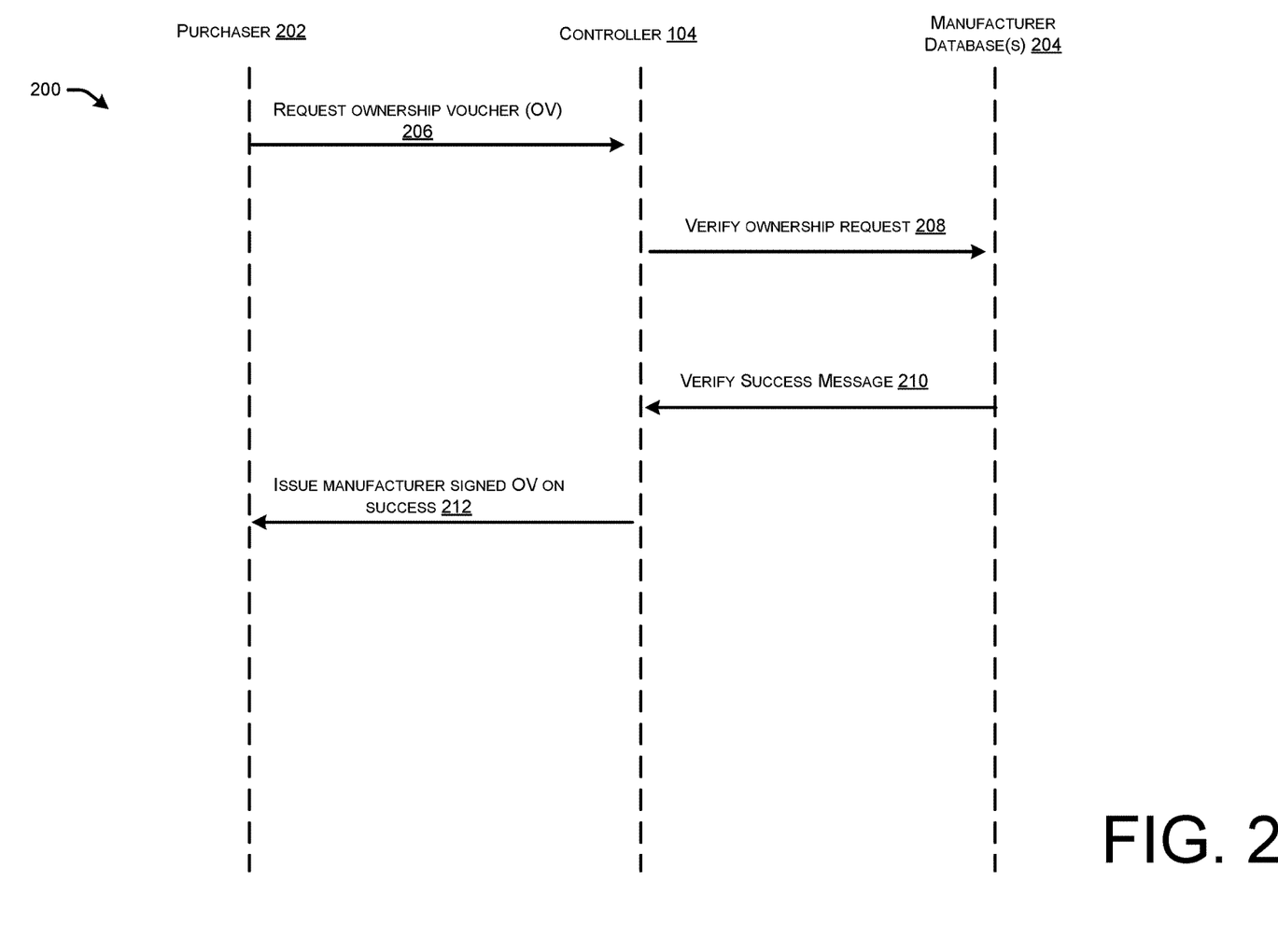
FIG. 2 illustrates a flow diagram of example communications corresponding to an initial purchase of a network device in both mediated and unmediated transfers of ownership.

FIG. 2 illustrates a flow diagram 200 of example communications corresponding to an initial purchase of a network device in both mediated and unmediated transfers of ownership. For instance, the network device may correspond to network device 112 described above. The purchaser 202 may be an intermediary user 106 or an end user 108. In the illustrative example, the purchaser 202 may communicate with the controller 104 of a manufacturer 102 using a device (e.g., network device 112 or any other computing device) via a network 110. In some examples, the controller 104 may comprise a service offered by the manufacturer. In the illustrative example, manufacturer 102 may be Cisco and the controller 104 may be associated with Cisco's MASA service. As illustrated in FIG. 2, the controller 104 may communicate with one or more manufacturer database(s) 204. For instance, the manufacturer database(s) may comprise the one or more databases described above in FIGS. 1A and 1B. In some examples, one or more of the operations and/or communications shown in FIG. 2 may be performed using a USB drive or the like.

At 206, the purchaser 202 may send a request for an ownership voucher to the controller 104. For instance, when a purchaser initially purchases a network device, the manufacturer 102 and/or controller 104 may record information (e.g., device information (serial number, SUDI, etc.), purchaser identity (name, etc.), or any other type of information) associated with the purchaser in one or more databases of the manufacturer 102. The intermediary user 106 may then initialize the network device 112 and send, via the network 110, a request to the manufacturer 102 and/or controller 104 for an ownership voucher. As described above, the request may comprise the request may include a pinned domain certificate (I-PDC) associated with the intermediary user 106. In some examples, the I-PDC may comprise a non-CA certificate.

At 208, the controller 104 may send a verify ownership request to the manufacturer database(s) 204. For instance, the verify ownership request may include information associated with the purchaser 202.

At 210, the manufacturer database(s) 204 may send a verify success message to the controller 104 where ownership of the network device is successfully verified. Where the ownership of the network device is not verified, the controller 104 may receive a verify failure message from the manufacturer database(s) 204. In the illustrative example, the manufacturer database 204 may determine whether ownership information associated with the initial purchase of the network device matches the information associated with the purchaser included in the request for the ownership voucher.

At 212, the controller 104 may send to the purchaser 202, a signed ownership voucher. For instance, the signed ownership voucher may be sent to the purchaser in response to receiving the verify success message. Where the controller 104 receives a verify failure message, the controller 104 may refrain from sending a signed ownership voucher to the purchaser. In some examples, the signed ownership voucher comprises a signed ownership voucher payload that is signed using a private key of the controller 104 and/or manufacturer 102. In some examples, the signed ownership voucher comprises an ownership certificate and/or the I-PDC provided by the purchaser 202.

Figure 3:
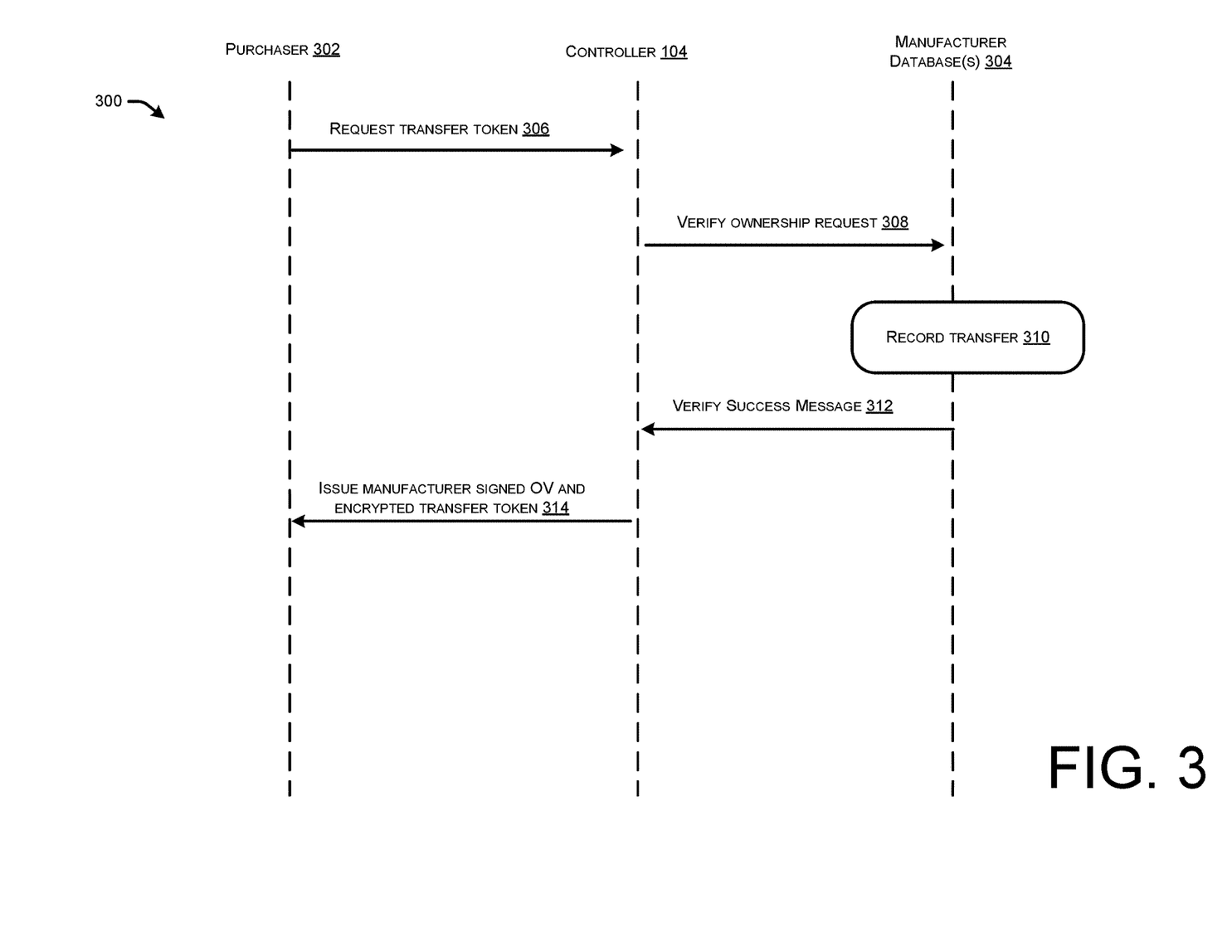
FIG. 3 illustrates a flow diagram of example communications corresponding to a request for a transfer token associated with a mediated transfer of ownership.

FIG. 3 illustrates a flow diagram of example communications corresponding to a request for a transfer token associated with a mediated transfer of ownership. For instance, the network device may correspond to network device 112 described above. The purchaser 202 may be an intermediary user 106 or an end user 108. In the illustrative example, the purchaser 302 may communicate with the controller 104 of a manufacturer 102 using a device (e.g., network device 112 or any other computing device and/or device) via a network 110 and/or a USB. In some examples, the controller 104 may comprise a service offered by the manufacturer. In the illustrative example, manufacturer 102 may be Cisco and the controller 104 may be associated with Cisco's MASA service. As illustrated in FIG. 2, the controller 104 may communicate with one or more manufacturer database(s) 304. For instance, the manufacturer database(s) may comprise the one or more databases described above in FIGS. 1A and 1B.

At 306, the purchaser 302 may send a request for an ownership voucher to the controller 104. For instance, when a purchaser initially purchases a network device, the manufacturer 102 and/or controller 104 may record information (e.g., device information (serial number, SUDI, etc.), purchaser identity (name, etc.), or any other type of information) associated with the purchaser in one or more databases (e.g., manufacturer database(s) 304) of the manufacturer 102. The purchaser 302 may then initialize the network device and send, via the network 110, a request to the controller 104 for an ownership voucher. As described above, the request may include a pinned domain certificate (I-PDC) associated with the purchaser 302. For instance, the I-PDC may be included in the request as an artifact. Additionally or alternatively the request may comprise the request may comprise one or more identifiers of the network device, a request for a transfer token (e.g., token 118 described above) from the manufacturer and/or information associated with a transfer of ownership to an end user (e.g., end user information, duration of the transfer, or any other suitable information).

At 308, the controller 104 may send a verify ownership request to the manufacturer databases 304. For instance, the verify ownership request may include information associated with the purchaser 202 and/or any other information included in the request for the ownership voucher.

At 310, the manufacturer database(s) 304 may record the transfer of ownership. For instance, the manufacturer database(s) 304 may validate the current ownership of the network device and determine that the network device is eligible to be transferred. The manufacturer database 304 may then record information associated with the transfer of ownership (e.g., new owner information, duration of the transfer, etc.) and/or invalidate any previous ownership vouchers associated with the network device.

At 312, the manufacturer database(s) 304 may send a verify success message to the controller 104 where ownership of the network device is successfully verified. Where the ownership of the network device is not verified, the controller 104 may receive a verify failure message from the manufacturer database(s) 304.

At 314, the controller 104 may generate and send to the purchaser 302, a signed ownership voucher and an encrypted transfer token. In some examples, the encryption may be performed using an encryption protocol (e.g., SSL, TSL, DTSL, etc.). For instance, the signed ownership voucher may be sent to the purchaser 302 in response to receiving the verify success message. Where the controller 104 receives a verify failure message, the controller 104 may refrain from sending a signed ownership voucher and transfer token to the purchaser. In some examples, the signed ownership voucher comprises a signed ownership voucher payload that is signed using a private key of the controller 104 and/or manufacturer 102. In some examples, the signed ownership voucher comprises the I-PDC provided by the purchaser 302. In some examples, the controller 104 may store the signed ownership voucher, information associated with the encrypted transfer token in the manufacturer databases 304.

Figure 4:
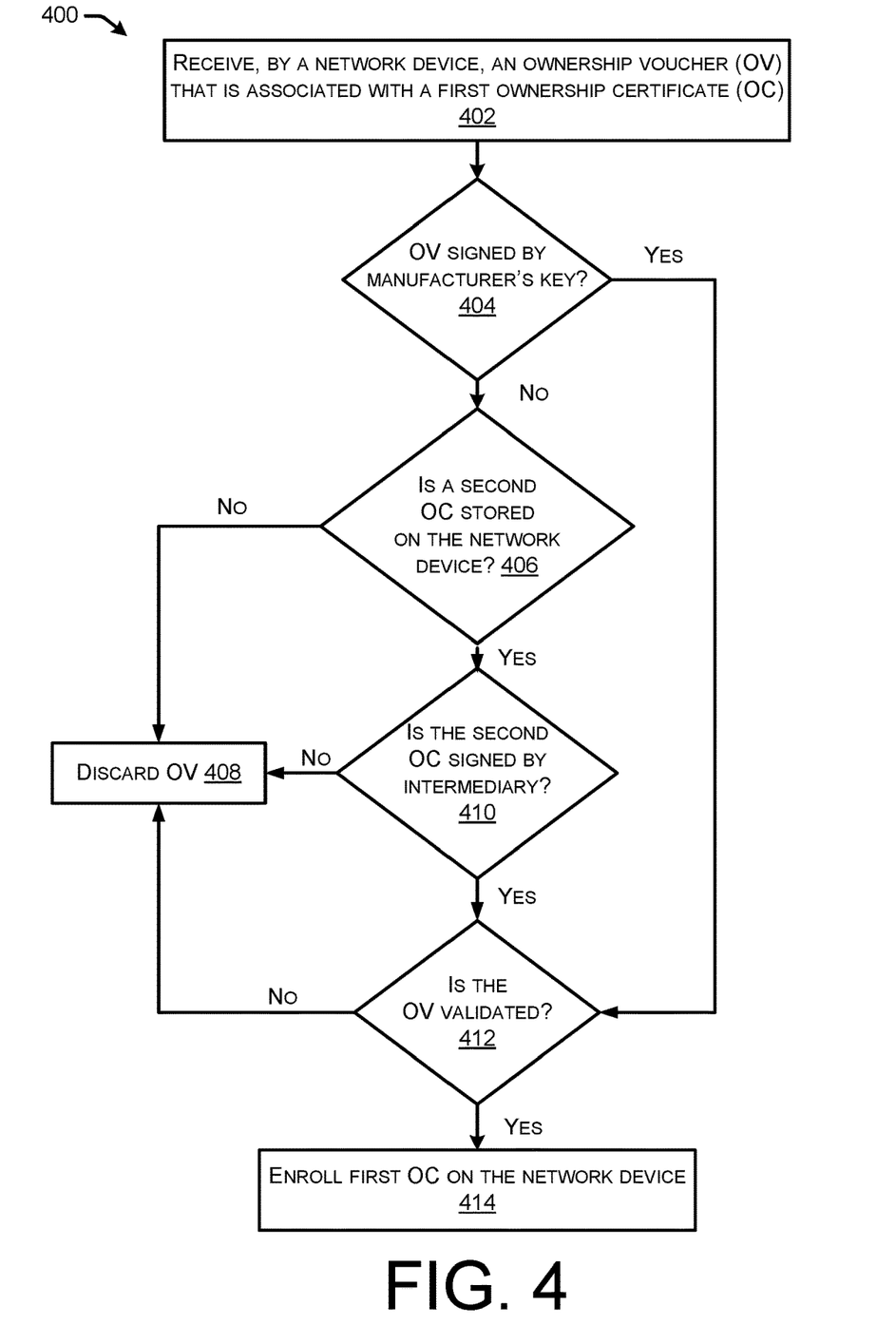
FIG. 4 illustrates a flow diagram of an example method for a device to perform unmediated transfer of ownership.

FIG. 4 illustrates a flow diagram of an example method 400 for a device to perform unmediated transfer of ownership. In some instances, the steps of method 400 may be performed by a device (e.g., network device 112) that includes one or more processors and one or more non-transitory computer-readable media storing computer-executable instructions that, when executed by the one or more processors, cause the one or more processors to perform operations of method 400.

At 402, the network device may receive an ownership voucher. As described above, the ownership voucher may comprise a signature of an intermediary ownership voucher artifact using a private portion of the intermediary PDC. In some examples, the ownership voucher may be associated with a first ownership certificate. In some examples, the network device may receive the ownership voucher in response to sending, to a device of an intermediary user, a request for an ownership voucher.

Figure 5:
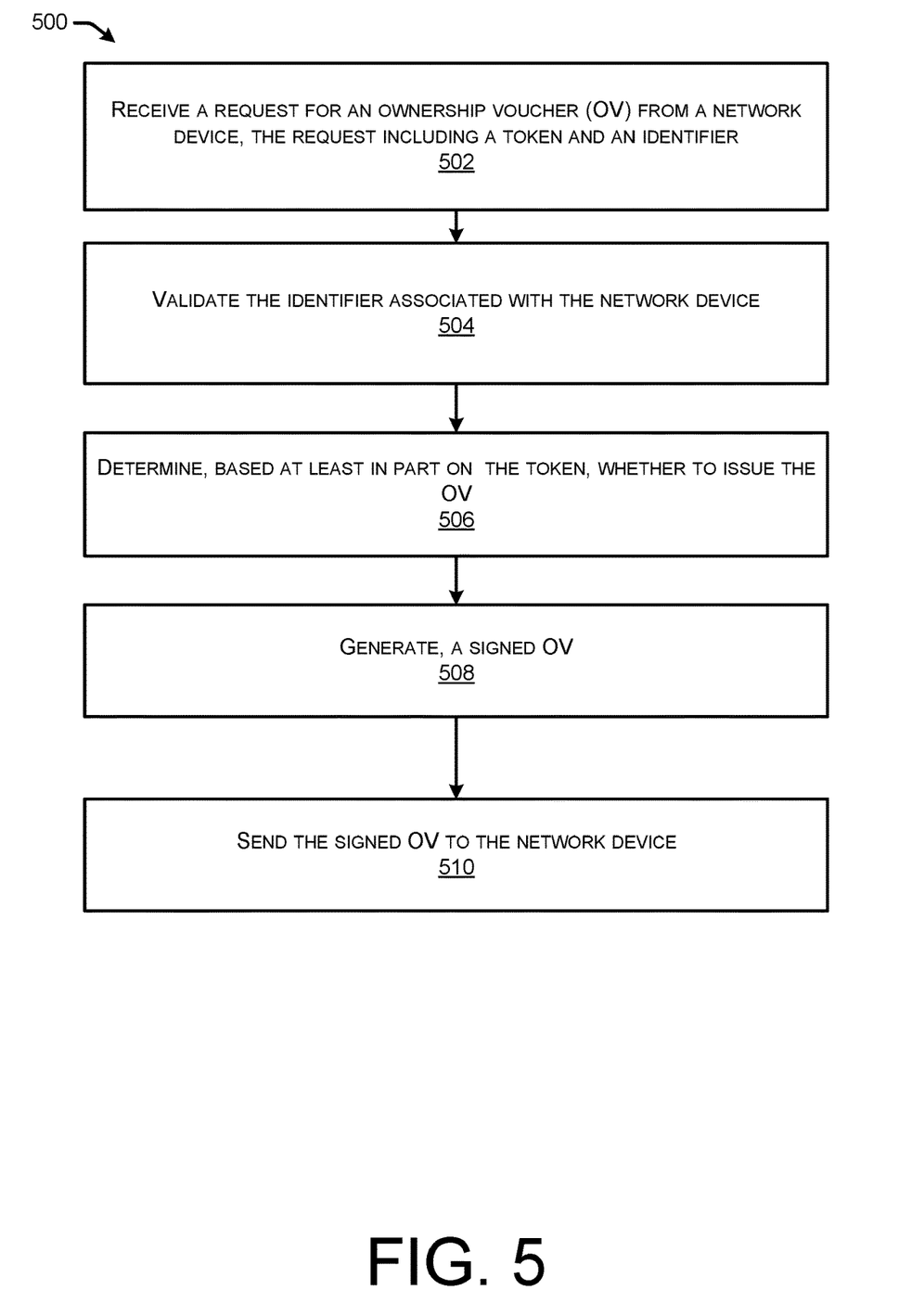
FIG. 5 illustrates a flow diagram of an example method for a system to perform mediated transfer of ownership.

At 404, the network device may determine whether the ownership voucher is signed by a manufacturer's key. For instance, the manufacturer's key may comprise a private key associated with the manufacturer.

Where the network device determines that the ownership voucher is signed by the manufacturer's key (404-YES), the method proceeds to 412, described in greater detail below.

Where the network device determines that the ownership voucher is not signed by the manufacturer's key (404-NO), the method proceeds to 406. At 406, the network device may determine whether a second ownership certificate is stored on the network device. For instance, the second ownership certificate may be stored in a private and/or secure portion of memory of the network device. In some examples, the second ownership certificate is associated with an intermediary user. In some examples, the second ownership certificate is associated with a second ownership voucher. For instance, the second ownership certificate may correspond to an "old" ownership certificate (e.g., a previously onboarded and/or enrolled ownership certificate) and may be chained to an I-PDC associated with a previous ownership voucher and/or previous owner.

Where the network device determines there is no second ownership certificate stored on the network device (406-NO), the method proceeds to 408. At 408, the network device may discard the ownership voucher.

Where the network device determines there is a second ownership certificate stored on the network device (406-YES), the method proceeds to 410. At 410, the network device may determine whether the ownership voucher (e.g., the ownership voucher received at 402) is signed by an intermediary user. For instance, the network device may determine that ownership voucher is signed by an I-PDC associated with the second ownership certificate (e.g., an intermediary I-PDC that is already installed on the device), where the I-PDC is associated with the intermediary user. In this way, the network device can verify that the incoming ownership voucher is signed by the I-PDC already installed on the network device.

Where the network device determines that the ownership voucher is not signed by an intermediary user (410-NO), the method proceeds to 408. At 408, the network device may discard the ownership voucher.

Where the network device determines that the ownership voucher is signed by an intermediary user (410-YES), the method proceeds to 412. At 412, the network device may determine whether the ownership voucher is validated.

Where the network device determines that the ownership voucher is not validated (412-NO), the method proceeds to 408. At 408, the network device may discard the ownership voucher.

Where the network device determines the ownership voucher not validated (412-YES), the method proceeds to 414. At 414, the network device may enroll the first ownership certificate on the network device. For instance, enrolling the first ownership certificate may comprise replacing the second ownership certificate (e.g., the existing ownership certificate) with the first ownership certificate (e.g., the new ownership certificate) in memory of the network device. In some examples, the first ownership certificate and/or one or more artifacts of the ownership voucher (e.g., PDC of the end user, I-PDC, public key of the ownership voucher, etc.) may be embedded in a secure portion (e.g., such as the TPM) of the memory of the network device. Additionally, or alternatively, the end user may enroll and/or embed additional signed artifacts, where the additional artifacts are signed with the PDC of the end user. In this way, the network device may embed the PDC of the end user in memory, thereby signifying the end user as the new owner of the network device. Moreover, by replacing the second ownership certificate (e.g., the existing and/or already enrolled ownership certificate) with the first ownership certificate, the techniques provide improved security by preventing multiple ownership certificates and/or PDC's from being stored by the network device and used to validate against PDC's of any ownership vouchers. For instance, by replacing the second ownership certificate with the first ownership certificate, the network device prevents an intermediary user from installing artifacts on the network device without an end user's consent and/or awareness, which may compromise network security of the end user. Accordingly, unmediated transfer of ownership of the network device may occur in a seamless and secure manner, without having to rely on connecting to the services hosted by the manufacturer and/or controller FIG. 5 illustrates a flow diagram of an example method 500 for a system to perform mediated transfer of ownership In some instances, the techniques may be performed by a system (e.g., one or more devices), such as the controller 104, a server (e.g., manufacturer 102), a combination thereof, and/or any other devices (e.g., hardware offload chips and/or any other device). The techniques of method 500 may be performed by a system that includes one processor, or more than one processor.

At 502, the system may receive a request for an ownership voucher from a network device. In some examples, the request may comprise a token and/or an identifier of the network device. In some examples, the token may comprise the token 118 described above. In some examples, identifier of the network device may comprise one or more of a SUDI, a serial number, or any other suitable identifier. The request may additionally or alternatively comprise a PDC associated with a user of the network device.

At 504, the system may validate the identifier associated with the network device. For instance, the system may determine that one or more of the identifiers associated with the network device match current ownership information stored in the one or more database(s) of the manufacturer.

At 506, the system may determine, based at least in part on the token, whether to issue the ownership voucher. For instance, the system may issue the signed ownership voucher where one or more of the following are met: token data stored in one or more databases of the manufacturer match the token received in the request, the token has not expired (if there is an expiry date associated with the token), and/or where the token comprises ownership information, the system determines the request if from the new owner identified by the token.

At 508, the system may generate a signed ownership voucher. For instance, the signed ownership voucher may be signed using a private key of the controller 104 and/or manufacturer.

At 510, the system may send the signed ownership voucher to the network device. For instance, the signed ownership voucher may be sent directly from the system to the network device of the end user. The network device of the end user may then verify that the signed ownership voucher comprises the private key of the manufacturer and, if so, proceed with enrolling the signed ownership voucher and/or other signed artifacts comprising the customer's PDC.

In some examples, the system may receive a message from the end user indicating the end user wants to relinquish ownership of the network device. In some examples, the end user may relinquish control of the network device when a time associated with token validity has expired. In other examples, the end user may relinquish control of the network device prior to the token expiring (e.g., to trade in the network device, in response to a security breach, or any other suitable reason). In this example, once the system receives the message indicating relinquishment of ownership and/or determines that the token associated with the end user is no longer valid, the system may update the ownership information in the one or more database(s) to indicate that the original purchaser (e.g., such as an intermediary user) is the current owner.

Figure 6:
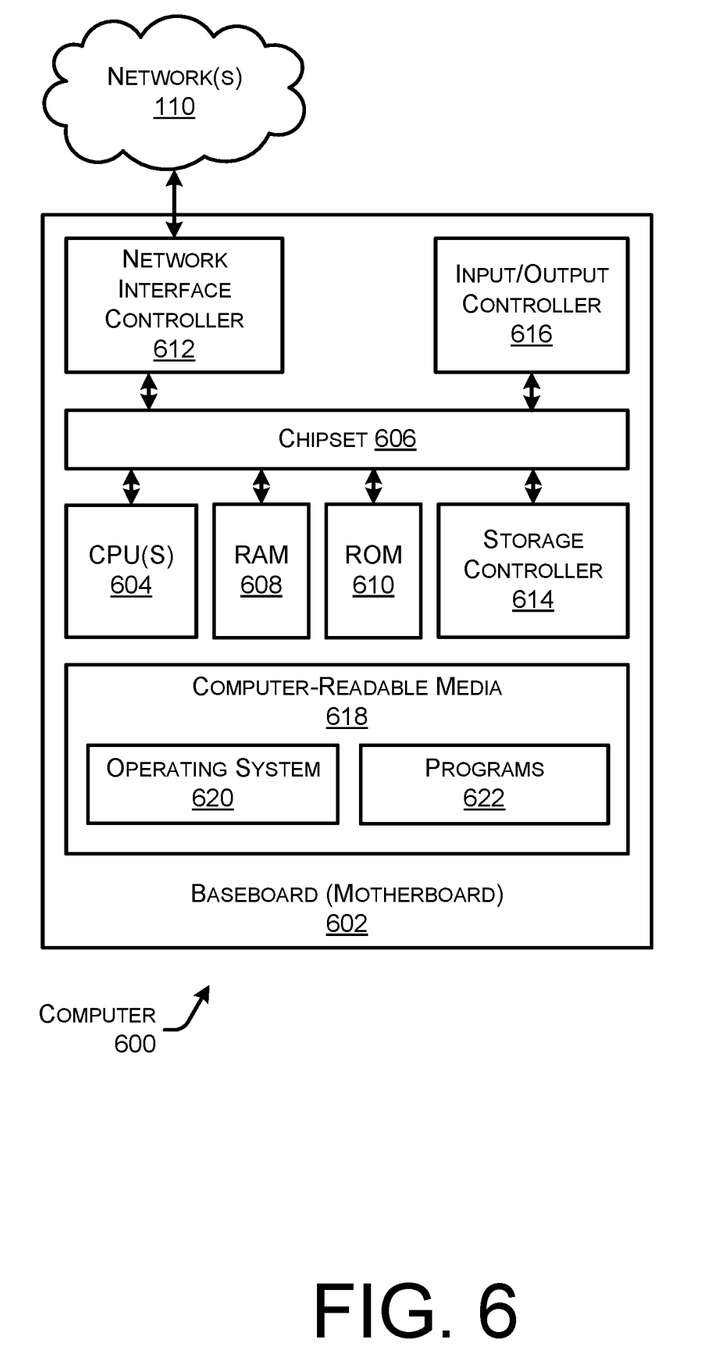
FIG. 6 is a computer architecture diagram showing an illustrative computer hardware architecture for implementing a server device that can be utilized to implement aspects of the various technologies presented herein.

FIG. 6 shows an example computer architecture for a device capable of executing program components for implementing the functionality described above. The computer architecture shown in FIG. 6 illustrates any type of computer 600, such as a conventional server computer, workstation, desktop computer, laptop, tablet, network appliance, e-reader, smartphone, or other computing device, and can be utilized to execute any of the software components presented herein. The computer may, in some examples, correspond to a network device 112, a controller 104, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as network(s) 110. The chipset 606 can include functionality for providing network connectivity through a NIC 612, such as a gigabit Ethernet adapter. The NIC 612 is capable of connecting the computer 600 to other computing devices over the network(s) 110. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the network device 112, the controller 104, and/or any components included therein, may be supported by one or more devices similar to computer 600. Stated otherwise, some or all of the operations performed by network device 112 and/or controller 104, and or any components included therein, may be performed by one or more computer devices 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

As described herein, the computer 600 may comprise one or more of a network device 112, a controller 104, and/or any other device. The computer 600 may include one or more hardware processors 604 (processors) configured to execute one or more stored instructions. The processor(s) 604 may comprise one or more cores. Further, the computer 600 may include one or more network interfaces configured to provide communications between the computer 600 and other devices, such as the communications described herein as being performed by the network device 112, the controller 104, and/or any other device. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure for performing mediated and/or unmediated transfer of ownership of a device. For instance, the programs 622 may cause the computer 600 to perform techniques for unmediated transfer of ownership, including: enrolling a first ownership certificate on the network device; sending, from the network device and to a device associated a user, a request for an ownership voucher, the request being associated with a transfer of ownership of the network device; receiving, from the device, the ownership voucher, the ownership voucher being associated with a second ownership certificate; determining whether the ownership voucher comprises a signature associated with a manufacturer of the network device; based at least in part on determining that the ownership voucher comprises the signature associated with the manufacturer: enrolling the second ownership certificate on the network device; based at least in part on determining that the signature associated with the manufacturer is absent: determining that the first ownership certificate is stored in memory of the network device; determining that the second ownership certificate comprises a signature associated with the user; validating the ownership voucher; and based at least in part on validating the ownership voucher, enrolling the second ownership certificate on the network device.

Additionally, or alternatively the programs 622 may cause the computer 600 to perform techniques for mediated transfer of ownership, including: receiving a request for an ownership voucher from a network device, the request including a token and an identifier of the network device, validating the identifier of the network device, determining, based at least in part on the token, to issue the ownership voucher, generating a signed ownership voucher, and sending, to the network device, the signed ownership voucher.

In this way, unmediated transfers of ownership may enable network devices to embed the PDC of the end user in memory, thereby signifying the end user as the new owner of the network device. Accordingly, unmediated transfer of ownership of the network device may occur in a seamless and secure manner, without having to rely on connecting to the services hosted by the manufacturer and/or controller. Moreover, in mediated transfers of ownership, the controller may provide a secure and mediated transfer of assets between intermediaries and also between different sub-organizations in an end user's network. By ensuring that intermediary users cannot claim ownership of a network device until either (i) a token expires or (ii) the end user notifies the controller of a relinquishment of ownership, the controller provides additional control to manufacturer and end users and prevents theft and unauthorized use of network devices.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method of mediated transfer of ownership of network devices within a network, the method comprising:
   receiving, by a controller, a request for an ownership voucher from a network device, the request including a token and an identifier of the network device, the token comprising a signature of the controller or a manufacturer of the network device and ownership information of the network device;
   validating, by the controller, the identifier of the network device;
   determining, by the controller and based at least in part on the token, to issue the ownership voucher;
   generating, by the controller and based on determining to issue the ownership voucher, a signed ownership voucher; and
   sending, by the controller and to the network device, the signed ownership voucher.

2. The method of claim 1, wherein the identifier comprises a secure unique device identification (SUDI) of the network device.

3. The method of claim 1, wherein the request further comprises a pinned domain certificate (PDC) associated with a new owner of the network device.

4. The method of claim 1, wherein determining to issue the ownership voucher further comprises:
   accessing token data associated with the network device;
   determining the token is valid; and
   determining, based at least in part on the token data and the token, that a transfer of ownership has occurred.

5. The method of claim 4, wherein determining the token is valid is based on one or more of:
   the token data, wherein the token data indicates data associated with a transfer token generated by a service provider;
   an expiration date associated with the token; or
   the ownership information associated with the token.

6. The method of claim 1, further comprising:
   determining whether the network device is eligible to transfer ownership; and
   based at least in part on determining the network device is eligible, storing one or more of:
      an indication of current ownership associated with the network device;
      an indication that any previous ownership vouchers associated with the network device are invalid;
      a time the signed ownership voucher is valid; or
      a certificate associated with a new owner of the network device.

7. The method of claim 1, wherein the network device is associated with an end user.

8. A system comprising:
   one or more processors; and
   one or more non-transitory computer-readable media storing computer-executable instructions that, when executed by the one or more processors, cause the one or more processors to perform operations comprising:
      receiving, by a controller, a request for an ownership voucher from a network device manufactured by a service provider, the request including a token and an identifier of the network device, the token comprising a signature of the controller or the service provider and an indication of a change in ownership of the network device;
      validating, by the controller, the identifier of the network device;
      determining, by the controller and based at least in part on the token, to issue the ownership voucher;
      generating, by the controller and based on determining to issue the ownership voucher, a signed ownership voucher; and
      sending, to the network device, the signed ownership voucher.

9. The system of claim 8, wherein the identifier comprises a secure unique device identification (SUDI) of the network device.

10. The system of claim 8, wherein the request further comprises a pinned domain certificate (PDC) associated with a new owner of the network device.

11. The system of claim 8, wherein determining to issue the ownership voucher further comprises:
    accessing token data associated with the network device;
    determining the token is valid; and
    determining, based at least in part on the token data and the token, that a transfer of ownership has occurred.

12. The system of claim 11, wherein determining the token is valid is based on one or more of:
    the token data, wherein the token data indicates data associated with a transfer token generated by the service provider;
    an expiration date associated with the token; or
    ownership information associated with the token.

13. The system of claim 8, the operations further comprising:
    determining whether the network device is eligible to transfer ownership; and
    based at least in part on determining the network device is eligible, storing one or more of:
       an indication of current ownership associated with the network device;
       an indication that any previous ownership vouchers associated with the network device are invalid;
       a time the signed ownership voucher is valid; or
       a certificate associated with a new owner of the network device.

14. The system of claim 8, wherein the network device is associated with an end user.

15. A method of unmediated transfer of ownership of a network device, the method comprising:
    enrolling, by the network device, a first ownership certificate on the network device, the first ownership certificate being stored in memory of the network device and associated with a first user;
    sending, from the network device and to a device associated with a second user, a request for an ownership voucher, the request being associated with a transfer of ownership of the network device from the first user to the second user;
    receiving, by the network device and from the device, the ownership voucher, the ownership voucher being associated with a second ownership certificate associated with the second user;
    determining, by the network device, whether the ownership voucher comprises a signature associated with a manufacturer of the network device;
    based at least in part on determining that the ownership voucher comprises the signature associated with the manufacturer:

enrolling, by the network device, the second ownership certificate on the network device, the second ownership certificate being stored in the memory of the network device;

based at least in part on determining that the signature associated with the manufacturer is absent:

determining, by the network device, that the first ownership certificate is stored in the memory of the network device;

determining, by the network device, that the second ownership certificate comprises a signature associated with the second user;

validating, by the network device, the ownership voucher; and based at least in part on validating the ownership voucher, enrolling the second ownership certificate on the network device.

16. The method of claim 15, wherein the request comprises a pinned domain certificate (PDC) associated with the second user, and wherein the second user corresponds to an end user of the network device.

17. The method of claim 15, wherein enrolling the second ownership certificate comprises:

updating the memory of the network device to indicate that the second ownership certificate is associated with a current ownership of the network device.

18. The method of claim 17, wherein the memory comprises a trusted platform module (TPM).

19. The method of claim 15, wherein the signature associated with the first user comprises a PDC associated with the first user.

20. The method of claim 15, wherein the ownership voucher is received from the device associated with the second user via a secure communication channel.

* * * * *